United States Patent [19]

Elmer

[11] 4,105,427
[45] Aug. 8, 1978

[54] PROCESS FOR DEWATERING POROUS GLASS

[75] Inventor: Thomas H. Elmer, Corning, N.Y.

[73] Assignee: Corning Glass Works, Corning, N.Y.

[21] Appl. No.: 790,707

[22] Filed: Apr. 25, 1977

[51] Int. Cl.² ............................................ C03C 15/00
[52] U.S. Cl. ........................................ 65/30 R; 65/32
[58] Field of Search ............................ 65/30 R, 31, 32

[56] References Cited

U.S. PATENT DOCUMENTS

| 2,982,053 | 5/1961 | Elmer | 65/30 R X |
| 3,149,946 | 9/1964 | Elmer | 65/31 X |
| 3,782,915 | 1/1974 | Filbert et al. | 65/30 R |
| 3,938,974 | 2/1976 | Macedo et al. | 65/30 R X |

FOREIGN PATENT DOCUMENTS

| 688,790 | 6/1964 | Canada | 65/31 |

Primary Examiner—Robert L. Lindsay, Jr.
Attorney, Agent, or Firm—Kees van der Sterre; Clinton S. Janes, Jr.; Clarence R. Patty, Jr.

[57] ABSTRACT

A process for removing hydroxyl groups from porous 96% silica glass to provide dewatered porous or consolidated glass, which method comprises the step of contacting the porous glass with water vapor prior to heating in a dry environment, is described.

6 Claims, 2 Drawing Figures

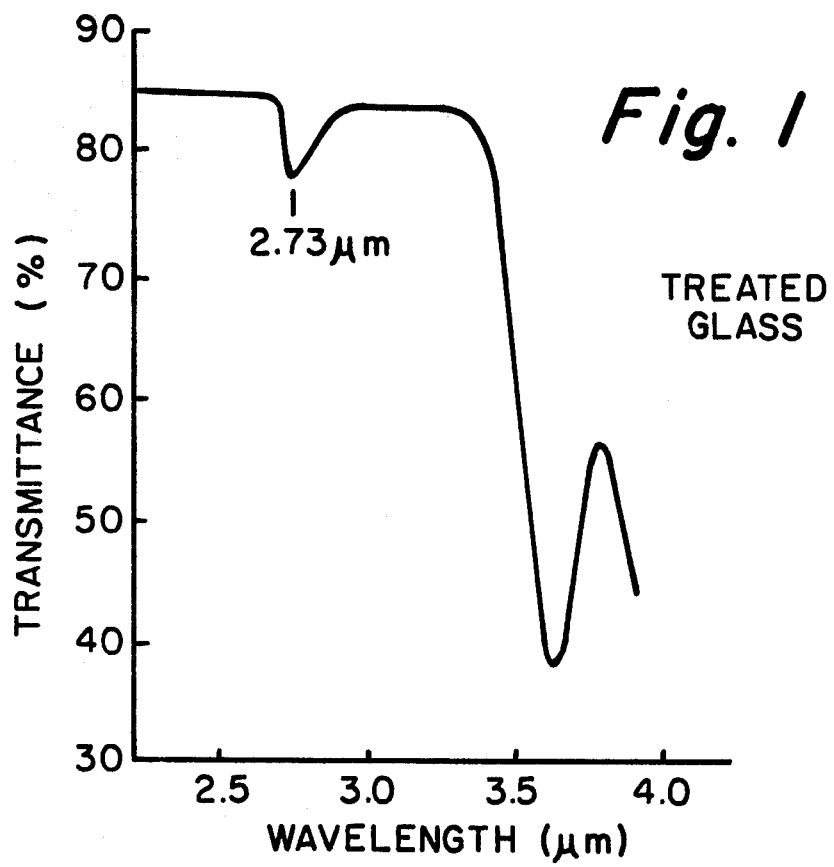
Fig. 1 — TREATED GLASS
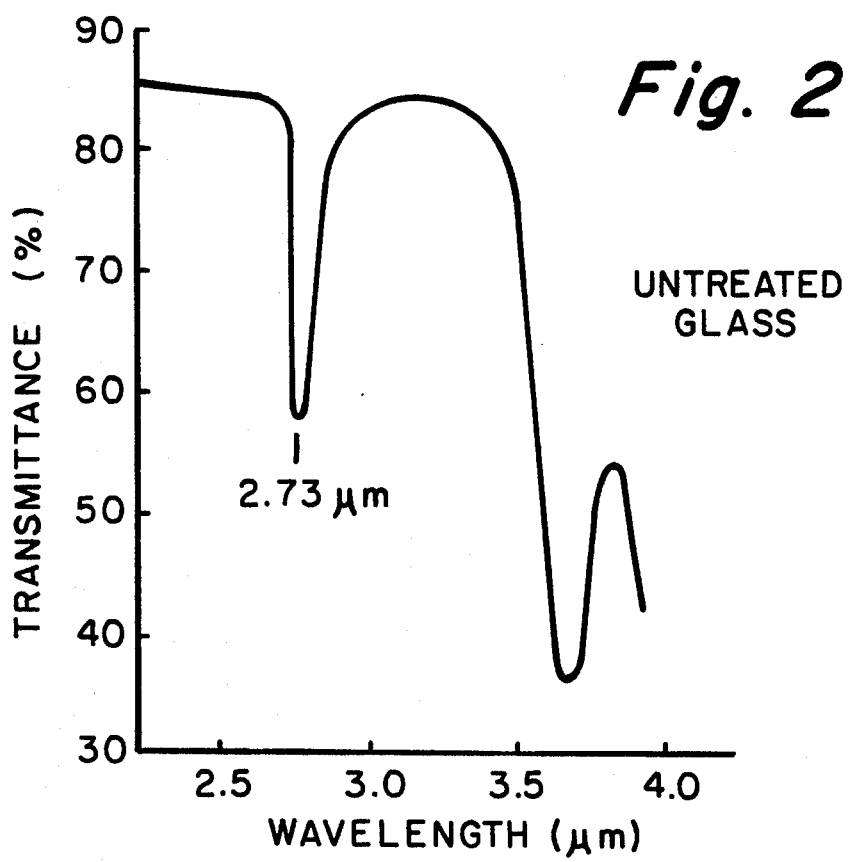
Fig. 2 — UNTREATED GLASS

PROCESS FOR DEWATERING POROUS GLASS

BACKGROUND OF THE INVENTION

The present invention relates to the treatment of glasses known in the art as 96% silica glasses, and particularly to the treatment of such glasses to modify the physical properties thereof by removing hydroxyl ions therefrom.

Glasses of the kind referred to as 96% silica glasses, and methods for manufacturing such glasses, are described in U.S. Pat. No. 2,106,744 to Hood et al. In accordance with such methods, alkali borosilicate glasses of specified composition are subjected to a phase separation heat treatment to separate the glass into a silica-rich phase and a phase rich in alkali and boron. This latter phase is then removed by leaching to provide a microporous glass body comprising a very high percentage of silica (typically at least about 95% by weight) and minor amounts of residual alkali and boron.

Glass produced by this process is referred to as 96% silica glass without regard to the exact silica content thereof, and may be used either in the porous state or after consolidation to the non-porous state by heating. In porous form, the glass may be used to support catalysts and enzymes, and as a chromatographic medium. Consolidated 96% silica glass is used to provide refractory glass articles such as crucibles and envelopes for arc lamps.

A number of methods are known for treating 96% silica glass in the porous state to modify glass properties for certain applications. U.S. Pats. Nos. 3,113,008 and 3,113,855, for example, describe methods for treating porous 96% silica glass to increase the annealing point thereof, while U.S. Pat. No. 3,804,647 describes stabilized porous glass catalyst support materials. U.S. Pat. No. 3,782,915 describes the use of ammonia and steam treatments to deactivate Lewis acid sites attributable to boron on porous glass to be used for chromatography, and it is known that boron can be expelled from porous glass by heating in a steam atmosphere.

It is also known that glasses generally can include hydroxyl species such as, for example, silanol groups (—Si—OH). These can result from the presence of hydroxides or water in batch materials, or from moisture otherwise introduced during glass processing. Such species not only reduce the annealing point of the glass but also give rise to infrared absorption bands therein.

Prior art methods of "dewatering" porous glass to remove hydroxyl species therefrom include firing treatments in a dry environment (e.g., dry air or vacuum) or treatment with chemical dehydroxylating agents such as chlorides or fluorides. U.S. Pat. No. 2,982,053 discloses fluoride treatments for dewatering porous glass, while U.S. Pat. No. 3,459,522 describes chloride treatments for this purpose.

Vacuum firing is inconvenient, while dry air treatments are not as effective in reducing the concentration of hydroxyl species as might be desired. Chloride and fluoride dehydroxylating agents introduce halogen ions into the glass which, unless properly controlled, act as fluxes to reduce the annealing point thereof.

It is a principal object of the present invention to provide a convenient process for dewatering porous glass through the removal of hydroxyl species therefrom which is quite effective in increasing the annealing point and reducing the infrared absorption of the glass.

It is a further object of the present invention to provide a dewatering process which does not require a vacuum firing step or the use of fluxing chemical drying constituents to achieve hydroxyl group removal.

Other objects and advantages of the invention will become apparent from the following description thereof.

SUMMARY OF THE INVENTION

I have now discovered that the dewatering or removal of hydroxyl species from porous 96% silica glass can be facilitated by treating the porous glass at an elevated temperature with water vapor prior to heating to expel such hydroxyl species. The effectiveness of an initial water vapor treatment step as an aid in removing water from the porous glass is not fully understood, but is thought to be somehow related to the loss of boron and of some silica from the pore surfaces of the porous glass which occurs during exposure to water vapor at elevated temperatures.

The glass dewatering process of the present invention comprises the initial step of contacting porous 96% silica glass with water vapor at an elevated temperature for a time at least sufficient to enhance the hydroxyl release characteristics of the glass. The elevated temperature used should be in the range of about 30°–150° C. below the annealing point of the glass.

After the glass has been heated in contact with water vapor as described, it is further heated at an elevated temperature in a dry environment for a time at least sufficient to expel hydroxyl groups therefrom. The dry environment may be a vacuum, if desired, but more conveniently is simply a dry atmosphere such as dry air or dry nitrogen. The elevated temperature used for this heating step should not exceed the consolidation temperature of the glass, which is that temperature at which the rapid collapse of pores occurs, in order to avoid trapping water in the glass.

Porous 96% silica glass which has been dewatered as described may be used in the porous state, or consolidated to provide non-porous 96% silica glass. Consolidation is advantageous since it removes the possibility that moisture from the environment will re-enter the pore structure of the glass.

DESCRIPTION OF THE DRAWING

The effectiveness of the process of the present invention is removing hydroxyl groups from porous 96% silica glass is illustrated by the drawing, wherein FIG. 1 is a graph of the infrared transmittance characteristics of a consolidated 96% silica glass sample dewatered in accordance with the process of the present invention, showing a relatively small absorption peak at 2.73 $\mu$m due to the presence of —OH groups in the glass, and FIG. 2 is a graph of the infrared transmittance characteristics of a consolidated 96% silica glass sample, not treated according to the invention, showing a relatively large absorption peak at 2.73 $\mu$m due to the presence of —OH groups in the glass.

DETAILED DESCRIPTION

The composition of porous 96% silica glass to be treated in accordance with the invention is not critical, although it is a factor which affects the annealing point and thus the range of processing temperatures most useful for treatment. The silica content of 96% silica glass may range from as low as 94% to as high as 97% or more by weight, but is typically about 96%–97%. The boron content of such glass is normally within the range of about 2%–3%. The annealing temperature of consolidated 96% silica glass varies somewhat with composition, but usually falls in the range of 950°–1050° C.

Inasmuch as hydroxyl groups tend to accelerate pore closure in porous glass, the step of contacting the glass with water vapor should be carried out at a temperature not higher than about 30° C. below the annealing point of the glass, in order to avoid the risk of extensive consolidation through pore closure. The glass consolidation temperature, i.e., that temperature at which rapid pore closure occurs, is normally somewhat above the annealing temperature of the glass under vapor conditions such as herein described.

The enhancement of the hydroxyl release characteristics of the glass under the influence of water vapor is thought to mainly involve boron volatilization, and is both time and temperature dependent. The use of a minimum vapor treatment temperature of 150° C. below the annealing temperature of the glass provides results within a reasonable treatment interval, e.g., 6 hours. On the other hand, relatively brief treatments, e.g., 15 minutes, are generally used at temperatures as high as 30° C. below the glass annealing point, in order to limit pore closure and water entrapment. Most porous glasses may be successfully treated at temperatures in the range of 850°–950° C. within a time interval of ½–3 hours.

The concentration of water vapor in the treating atmosphere is not critical; either pure water vapor or water-vapor-containing air or other atmosphere may be used. While the ultimate extent of dewatering apparently depends on both vapor concentration and the duration of the vapor treatment, it is thought that the removal of at least some surface boron from the glass will provide at least some improvement in the ability of the glass to release hydroxyl groups on subsequent heating.

The rate of expulsion of hydroxyl groups by the glass in a dry environment is also temperature dependent. It is generally desirable to heat the porous glass at a temperature as high as possible to accelerate hydroxyl removal; however, the temperature used should be below the glass consolidation temperature to avoid trapping hydroxyl species in the glass. If heating is continued at temperatures of the order used in the previous water vapor treatment step of the process, e.g., 850° C. and above, the removal of entrained water vapor and loss of hydroxyl groups commences immediately. Moreover, since the loss of hydroxyl groups makes the porous glass more refractory and thus raises the consolidation temperature thereof, the treatment temperature may be gradually increased as treatment progress without hazarding extensive consolidation.

The length of the drying step depends upon the degree to which hydroxyl removal is desired. By way of illustration, however, essentially complete expulsion of hydroxyl groups available for removal from porous glass of 1 mm wall thickness can be accomplished within a time interval of about ½–4 hours at temperatures in the 950° C.–1100° C. range. At the higher temperature in this range, shorter treatments are normally used, and vice versa.

Although the water vapor-treated porous glass may be heated in a vacuum for the purpose of hydroxyl removal as described, a particular advantage of the process is that substantial dewatering may be achieved without the need for special vacuum equipment. Thus the preferred dry environment for the dehydroxylating step of the process is dry air, although other dry atmospheres such as dry nitrogen could of course be substituted therefor.

Consolidation of the dewatered porous glass is accomplished by heating in the known manner, and the use of a consolidation step following the removal of hydroxyl groups is customary since a non-porous glass product is usually required. Conveniently, consolidation is accomplished immediately subsequent to the dehydroxylating step by merely raising the temperature of the porous glass above the consolidation temperature after sufficient hydroxyl removal has been achieved. Significant consolidation of dehydroxylated glass typically commences at about 1050° C., with final consolidation temperatures in the 1200°–1350° C. range being used to insure that consolidation is complete.

The extent of dehydroxylation obtained in any particular case may be determined by comparing the infrared absorption characteristics of treated and untreated glass. Both types of glass exhibit absorption bands in the infrared due to the presence of —OH groups therein, but the absorption of treated glass is significantly reduced. Quantitative comparisons are based on the relative height of the absorption peak at 2.73 $\mu$m in the infrared. The so-called $\beta_{OH}$ value associated with this peak, which is a measure of peak height, is defined as follows:

$$\beta_{OH} = 1/t \log_{10}(T_{2.6}/T_{2.73})$$

wherein $t$ = sample thickness in millimeters $T_{2.6}$ = sample transmittance in percent at 2.6 $\mu$m $T_{2.73}$ = sample transmittance in percent at 2.73 $\mu$m (the OH absorption peak)

The $\beta_{OH}$ value of treated glass, computed from the above equation, is typically substantially lower than the $\beta_{OH}$ value of untreated glass of the same basic composition.

The invention may be further understood by reference to the following detailed examples.

EXAMPLE 1

Two sample lengths of porous glass tubing, each three inches in length, 9 millimeters in outside diameter, and having a wall thickness somewhat in excess of 1 millimeter, are provided for treatment. The porous samples are produced by the phase separation of alkali borosilicate glass tubing at 575° C., followed by leaching of the phase-separated glass tubing in nitric acid. The samples are washed, dried and prefired to 900° C. in air prior to treatment. The composition of the porous glass making up the tubing includes about 96% silica and 3% boron by weight.

One of the lengths of porous glass tubing, identified as Sample A, is positioned in a tube furnace, heated to a temperature of about 900° C. in flowing dry air, and maintained at that temperature for 3 hours. The sample is then further heated in flowing dry air to 1230° C. at a rate of about 100° C. per hour, held at 1230° C. for 30 minutes to insure complete consolidation, and finally cooled to room temperature.

The second length of porous glass tubing, identified as Sample B, is positioned in a tube furnace, heated to a temperature of about 900° C. in a flowing water-vapor-containing atmosphere, (consisting of about 78.6% water vapor and 21.4% air by volume), and held at 900° C. in the flowing water-vapor-containing atmosphere for 3 hours. Thereafter, flowing dry air is substituted for flowing moist air, while maintaining the temperature at 900° C., and after a few minutes at 900° C. the porous glass is heated in flowing dry air at a rate of 100° C. per hour to 1230° C. The glass is maintained at 1230° C. for 30 minutes to complete consolidation, and is finally cooled to room temperature.

Samples A and B are then examined to determine their infrared transmittance characteristics. Examination of the infrared transmittance spectra of the two samples indicates that Sample A, which was fired in dry air without water vapor treatment, exhibits a substantially higher absorption peak at 2.73 μm than Sample B. Calculation of $\beta_{OH}$ values from the transmittance spectra of the two samples yields a $\beta_{OH}$ value of 0.187 mm$^{-1}$ for Sample A and a $\beta_{OH}$ value of 0.050 mm$^{-1}$ for Sample B, showing a considerable reduction in hydroxyl group content in Sample B due to the water vapor treatment.

The dry air treatment (without prior water vapor treatment) of identical glass samples from the same lot of porous glass tubing at temperatures ranging from 850°–1000° C. prior to consolidation typically provides 96% silica glass tubing exhibiting final $\beta_{OH}$ values ranging from about 0.140–0.214 mm$^{-1}$. In contrast, water vapor treatment prior to drying of identical samples at temperatures in this range can provide significantly lower $\beta_{OH}$ values, if proper treatment times are selected. Hence, a tubing sample contacted with water vapor (78% by volume) at 1000° C. for 15 minutes prior to consolidation in dry air exhibits a final $\beta_{OH}$ value of 0.081 mm$^{-1}$, while a sample contacted with water vapor (77.5% by volume) at 850° C. for 3 hours prior to consolidation exhibits a final $\beta_{OH}$ value of 0.096 mm$^{-1}$.

EXAMPLE 2

Two sample lengths of porous glass tubing, each 3 inches in length, ⅜ inches in outer diameter, and having a wall thickness somewhat in excess of 1 millimeter, are selected for treatment. The samples are produced by phase separation of alkali borosilicate glass tubing at 550° C. and leaching of the phase-separated glass tubing in nitric acid. The porous glass making up the tubing has a composition which includes about 97% silica and 2.1% boron by weight.

One of the lengths of porous glass tubing, identified as Sample X, is positioned in a tube furnace, heated to 900° C. in a flowing water vapor atmosphere, (consisting of 100% water vapor), maintained at 900° C. in that atmosphere for 3 hours, and thereafter cooled to room temperature. The other length of tubing, identified as Sample Y, is not treated.

Vapor-treated Sample X and untreated Sample Y are then prefired in air by heating to 850° C. at a rate of 100° C. per hour, and vacuum-fired according to a schedule comprising an exposure in vacuum to 900° C. for 0.5 hours, 950° C. for 1 hour, 1000° C. for 1 hour, 1050° C. for 1 hour, and 1250° C. for 0.5 hours to dewater and consolidate the glass.

After cooling to room temperature, the samples are tested for infrared transmittance and their infrared spectra are examined. In addition to slightly reduced intensity in the boron absorption bands of the water vapor-treated glass (Sample X), suggesting a reduced boron content, it is observed that the concentration of hydroxyl groups in the treated glass is considerably lower than that in the untreated glass (Sample Y). Hence, Sample X exhibits a $\beta_{OH}$ value of 0.037 mm$^{-1}$, while Sample Y exhibits a $\beta_{OH}$ value of 0.17 mm$^{-1}$. Such data confirms that effectiveness of a water vapor treatment step in facilitating the dehydroxylation of porous glass, even where vacuum firing is used to help expel water vapor and hydroxyl groups from the glass.

The foregoing examples are of course merely illustrative of the various techniques and procedures which may be utilized in carrying out the process of the invention within the scope of the appended claims.

I claim:

1. A process for dewatering porous 96% silica glass which comprises the steps of:
   (a) contacting the porous glass with water vapor at a temperature ranging from about 30°–150° C. below the annealing point of the glass for a time at least sufficient to enhance the hydroxyl release characteristics of the glass;
   (b) heating the porous glass in a dry environment at a temperature below the consolidation temperature thereof for a time at least sufficient to expel hydroxyl groups therefrom; and
   (c) consolidating the porous glass to non-porous glass.

2. A process in accordance with claim 1 wherein the porous glass is contacted with water vapor for a time interval of 15 minutes to 6 hours.

3. A process in accordance with claim 1 wherein the porous glass is contacted with water vapor at a temperature ranging from about 850°–950° C. for a time in the range of ½–3 hours.

4. A process in accordance with claim 1 wherein the dry environment is dry air or dry nitrogen.

5. A process in accordance with claim 1 wherein heating in a dry environment comprises an exposure to dry air at 950°–1100° C. for ¼–4 hours.

6. A process in accordance with claim 1 wherein the dry environment is a vacuum.

* * * * *